United States Patent
Albarello et al.

(10) Patent No.: US 12,404,011 B2
(45) Date of Patent: Sep. 2, 2025

(54) AIRCRAFT SYSTEM

(71) Applicant: AIRBUS OPERATIONS LIMITED, Bristol (GB)

(72) Inventors: Alessandro Albarello, Bristol (GB); David Paviour, Bristol (GB); Daren Payne, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 394 days.

(21) Appl. No.: 17/681,129

(22) Filed: Feb. 25, 2022

(65) Prior Publication Data

US 2022/0324556 A1   Oct. 13, 2022

(30) Foreign Application Priority Data

Feb. 26, 2021   (GB) ...................................... 2102829

(51) Int. Cl.
*B64C 25/16*   (2006.01)
(52) U.S. Cl.
CPC .................................... *B64C 25/16* (2013.01)
(58) Field of Classification Search
CPC ...................................................... B64C 25/16
See application file for complete search history.

(56) References Cited

U.S. PATENT DOCUMENTS

| | | | |
|---|---|---|---|
| 5,955,972 A * | 9/1999 | Wade | G09B 9/203 340/960 |
| 6,854,689 B1 | 2/2005 | Lindahl et al. | |
| 9,517,837 B2 | 12/2016 | Lecourtier | |
| 2006/0027706 A1* | 2/2006 | Lindahl | B64C 25/22 244/102 R |
| 2006/0032981 A1* | 2/2006 | Fort | B64C 25/16 244/129.4 |
| 2009/0008501 A1* | 1/2009 | Chow | B64C 25/16 244/100 R |
| 2010/0200704 A1* | 8/2010 | Berens | B64C 13/16 244/76 A |

(Continued)

FOREIGN PATENT DOCUMENTS

| | | |
|---|---|---|
| EP | 2 082 956 | 7/2009 |
| GB | 2563437 | 12/2018 |

(Continued)

OTHER PUBLICATIONS

A380 Door and Landing Gear Animation, Chris Shakal, May 2, 2015, https://www.youtube.com/watch?v=P1Xarq1Yr1Y (Year: 2015).*

(Continued)

*Primary Examiner* — Anne Marie Antonucci
*Assistant Examiner* — Luis G Del Valle
(74) *Attorney, Agent, or Firm* — Nixon & Vanderhye P.C.

(57) ABSTRACT

An aircraft system for an aircraft is disclosed including a controller. The controller is configured, during a take-off procedure, to initiate automatic closing of a landing gear bay door of the aircraft from an open position towards a closed position, on the basis of a determination that a predetermined door-closing criterion has been met and a command to retract a landing gear has not been received, the landing gear being arranged to retract into a landing gear bay to be at least partially covered by the landing gear bay door when the landing gear bay door is in the closed position.

19 Claims, 4 Drawing Sheets

(56) References Cited

U.S. PATENT DOCUMENTS

| | | | | |
|---|---|---|---|---|
| 2011/0066306 A1* | 3/2011 | Berthereau | ............. | B64C 13/16 |
| | | | | 701/15 |
| 2015/0367933 A1* | 12/2015 | Li | ......................... | F16F 9/0209 |
| | | | | 701/3 |
| 2017/0355473 A1* | 12/2017 | Cahill | ..................... | B64C 25/34 |
| 2019/0152589 A1* | 5/2019 | Evans | ..................... | B64C 25/22 |
| 2020/0055592 A1* | 2/2020 | Rowlands | ............... | B64C 25/26 |
| 2020/0247552 A1* | 8/2020 | Lisio | ..................... | B64D 27/10 |
| 2020/0277042 A1 | 9/2020 | Kerr et al. | | |
| 2021/0206510 A1* | 7/2021 | Kimsey-Lin | ........... | B64D 47/06 |

FOREIGN PATENT DOCUMENTS

| | | |
|---|---|---|
| GB | 2585065 | 12/2020 |
| GB | 2587205 | 3/2021 |
| WO | 2019/166461 | 9/2019 |

OTHER PUBLICATIONS

Combined Search and Examination Report for Application No. GB 2102829.5 dated Nov. 25, 2021, 10 pages.

* cited by examiner

AIRCRAFT SYSTEM

CROSS RELATED APPLICATION

This application claims priority to United Kingdom Patent Application GB2102829.5, filed Feb. 26, 2021, the entire contents of which is hereby incorporated by reference.

TECHNICAL FIELD

The present invention relates to an aircraft system for an aircraft, to a method of operating a controller of an aircraft system of an aircraft during a take-off procedure, and to an aircraft.

BACKGROUND

In some known aircraft, a landing gear of the aircraft is held in an extended position when the aircraft is on the ground and is retracted to a stowed position once the aircraft has taken off. Movement of the landing gear between the extended position and the stowed position is typically controlled by a pilot using cockpit controls of the aircraft, such as a landing gear lever. In several of these known aircraft, a landing gear bay door, in a closed position, fully or partially covers a landing gear bay in which the landing gear is stored in the stowed position. The landing gear and landing gear bay door cause aircraft drag during a take-off procedure until they reach their respective stowed and closed positions.

SUMMARY

A first aspect of the present invention provides an aircraft system for an aircraft, the aircraft system comprising a controller. The controller is configured, during a take-off procedure, to initiate automatic closing of a landing gear bay door of the aircraft from an open position towards a closed position, on the basis of a determination that a predetermined door-closing criterion has been met and a command to retract a landing gear has not been received, the landing gear being arranged to retract into a landing gear bay to be at least partially covered by the landing gear bay door when the landing gear bay door is in the closed position.

Optionally, the controller is configured to cause the landing gear to remain in an extended position during the automatic closing of the landing gear bay door.

Optionally, the controller is configured to initiate the automatic closing of the landing gear bay door on the basis of a determination that the aircraft is in-flight.

Optionally, the predetermined door-closing criterion comprises that the landing gear bay door has been in the open position for a predetermined door-open period as measured from a predetermined point in time.

Optionally, the predetermined point in time is a point in time at which it is determined by the controller that lift-off of the aircraft has occurred.

Optionally, the predetermined point in time is a point in time at which it is determined by the controller that weight off wheels has occurred.

Optionally, the predetermined point in time is a point in time at which, during the take-off procedure, the controller initiates automatic opening of the landing gear bay door from the closed position towards the open position.

Optionally, the predetermined point in time is a point in time at which, during the take-off procedure, the landing gear bay door reaches the open position after opening of the landing gear bay door from the closed position towards the open position.

Optionally, the controller is configured to initiate the automatic closing of the landing gear bay door in the event that the controller determines that the door-closing criterion is met and a one engine inoperative situation has occurred.

Optionally, the predetermined door-closing criterion comprises that a climb rate of the aircraft is below a climb rate threshold.

Optionally, the predetermined door-closing criterion comprises that an altitude of the aircraft is below an altitude threshold at a given time after lift-off.

Optionally the predetermined door-closing criterion comprises that the aircraft is being flown by a single pilot.

Optionally, the controller is configured, during the take-off procedure, to initiate, prior to receiving the command to retract the landing gear and prior to initiating the automatic closing of the landing gear bay door, automatic opening of the landing gear bay door from the closed position towards the open position.

Optionally, the controller is configured to initiate the automatic opening of the landing gear bay door on the basis of a determination by the controller that a one engine inoperative situation has occurred and that lift-off of the aircraft has occurred.

Optionally, the aircraft system comprises the landing gear, the landing gear bay door, and a landing gear extension and retraction system configured to extend and retract the landing gear and open and close the landing gear bay door.

A second aspect of the present invention provides an aircraft system for an aircraft, the aircraft system comprising a controller that is configured, during a take-off procedure, to automatically cause a landing gear bay door of the aircraft to move from an open position towards a closed position, on the basis of a determination that a command to retract a landing gear has not been received within a predetermined period after lift-off of the aircraft, the landing gear being arranged to retract into a landing gear bay to be at least partially covered by the landing gear bay door when the landing gear bay door is in the closed position.

Optionally, the predetermined period after lift-off of the aircraft is measured from a predetermined point in time, the predetermined point in time being any predetermined point in time as described above with reference of the first aspect of the present invention.

Optionally, the aircraft system comprises any of the features described with reference to the first aspect of the present invention.

A third aspect of the present invention provides method of operating a controller of an aircraft system of an aircraft during a take-off procedure. The method comprises: the controller determining that a predetermined door-closing criterion has been met and a command to retract a landing gear has not been received, and on the basis of the determination, the controller initiating automatic closing of a landing gear bay door of the aircraft from an open position towards a closed position, the landing gear bay door being arranged, when at the closed position, to at least partially cover a landing gear bay into which the landing gear is retractable.

Optionally, the initiating is on the basis of a determination that the landing gear bay door has been in the open position for a predetermined door-open period as measured from a predetermined point in time.

Optionally, the method comprises the controller determining if a one engine inoperative situation has occurred, and the controller initiating the automatic closing on the basis of a determination by the controller that a one engine inoperative situation has occurred.

Optionally, the method comprises the controller determining if a one engine inoperative situation has occurred, the controller determining if lift-off of the aircraft has occurred, and, on the basis of determining that the one engine inoperative situation and lift-off of the aircraft have occurred, the controller initiating, prior to receiving the command to retract the landing gear and prior to initiating the automatic closing of the landing gear bay door, automatic opening of the landing gear bay door from the closed position towards the open position.

A fourth aspect of the present invention provides a non-transitory computer-readable storage medium storing instructions that, if executed by a controller of an aircraft system of an aircraft, cause the controller to carry out the method according to the third aspect of the present invention.

A fifth aspect of the present invention provides an aircraft comprising the aircraft system according to the first or second aspect of the present invention, or comprising the non-transitory computer-readable storage medium according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

As discussed above, in some known aircraft, the landing gear is held in an extended position when the aircraft is on the ground and is stowed at a stowed position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. A landing gear bay door may at least partially cover the landing gear bay when closed and may be openable to enable movement of the landing gear between the stowed position and the extended position. Movement of the landing gear and the landing gear bay door is typically controlled by a pilot using cockpit flight controls of the aircraft, such as a landing gear control lever.

The take-off procedure is one of the highest workload flight phases for flight crew. Amongst the many actions they perform during this period is the retraction of the landing gear after lift-off. During a take-off procedure, the pilot will typically manually initiate a landing gear retraction procedure upon confirming a positive aircraft climb rate. Positive climb rate typically is confirmed by the pilot or another member of the flight crew looking through a window of the cockpit to check that the aircraft is ascending from the ground or checking an altimeter or vertical speed indicator for an increase in altitude. Such confirmation typically occurs at or before three seconds after lift-off.

The workload during a take-off procedure can be increased, if a fault or failure occurs in an engine of the aircraft (commonly referred to as a "one engine inoperative", or "OEI", situation). While the aircraft will have been designed so that the remaining engine(s) can generate sufficient thrust to get the aircraft airborne with an acceptable safety margin, there will nevertheless be a reduction in total thrust generated or generatable by the engine(s) of the aircraft, meaning that drag caused by the landing gear has a greater proportional effect on aircraft performance compared to an "all engines operative", or "AEO", situation.

Some examples discussed herein are concerned with reducing the drag caused by a delay in retracting the landing gear, for example in an OEI situation. In particular, some examples are concerned with automatically closing a landing gear bay door.

The technology discussed herein has application at least in civil aircraft, military aircraft, and unmanned aerial vehicles (UAVs). Some examples discussed herein are implementable within these areas of application when there is only one flight crew or no flight crew at all. The engine of the aircraft discussed herein could be any type of aircraft engine for generating thrust, such as a gas turbine engine, an electric motor, or a piston engine.

Figure 1:
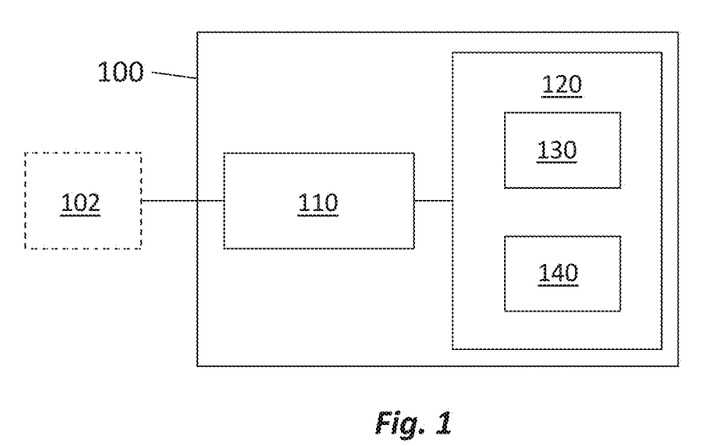
FIG. 1 shows a schematic view of an example of an aircraft system.

FIG. 1 shows a schematic view of an aircraft system 100 for an aircraft according to an example. The system 100 comprises a controller 110 and a landing gear extension and retraction system (LGERS) 120. The LGERS 120 comprises a landing gear bay door 130 and a landing gear 140. In other examples, one or more of the landing gear extension and retraction system 120, the landing gear bay door 130 and the landing gear 140 may be omitted from the aircraft system 100. That is, they may for example be comprised in one or more other systems with which the system 100 interacts. The landing gear bay door 130 is a door of a landing gear bay for accommodating the landing gear 140. The LGERS 120 is caused by the controller 110 to extend or retract the landing gear 140 following receipt, by the controller 110, of the command to do so. In the stowed position, the landing gear 140 is positioned in the landing gear bay. An opening of the landing gear bay is at least partially covered or blocked by the landing gear bay door 130 when the landing gear bay door 130 is in the closed position, and is uncovered by the landing gear bay door 130 when the landing gear bay door 130 is moved to an open position from the closed position. The degree of coverage of the opening is greater when the landing gear bay door 130 is at the closed position compared to at the open position. The landing gear extension and retraction system 120 is configured to extend and retract the landing gear 140 and to open and close the landing gear bay door 130.

The controller 110 is configured, during a take-off procedure, to initiate automatic closing of the landing gear bay door 130 from the open position towards the closed position, on the basis of a determination that a predetermined door-closing criterion has been met and the command to retract a landing gear 140 has not been received. A take-off procedure is a procedure carried out between an aircraft starting a take-off acceleration on a runway and the aircraft reaching acceleration altitude after lift-off. The automatic closing of the landing gear bay door 130 can help to reduce the impact on aircraft performance caused by a delay in the pilot commanding retraction of the landing gear. Such a configuration may be beneficial in situations, for example, when the landing gear bay door 130 has been opened after take-off, either automatically or manually, but a pilot of the aircraft does not command retraction of the landing gear 140, the landing gear 140 cannot be retracted due to a fault, or the pilot is delayed in commanding retraction of the landing gear 140. In this example, the controller 110 is configured to cause the landing gear 140 to remain in the extended position during the automatic closing of the landing gear bay door 130.

Figure 2:
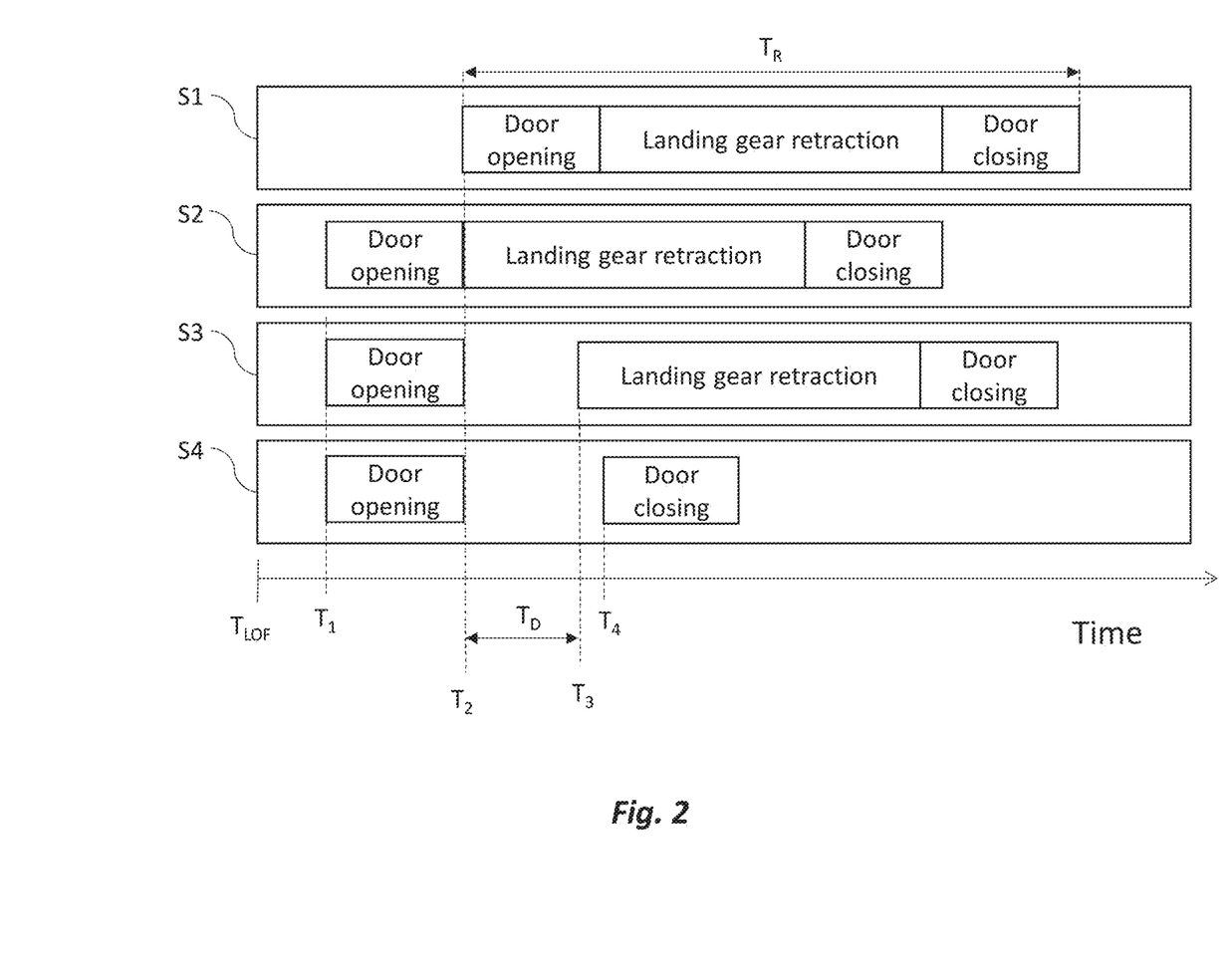
FIG. 2 shows a diagrammatic representation of landing gear retraction sequences in different take-off scenarios.

FIG. 2 shows a diagrammatic representation of a landing gear retraction sequence in four different take-off scenarios, S1, S2, S3 and S4. The landing gear retraction sequence comprises landing gear bay door opening, landing gear retraction from the extended position to the stowed position, and landing gear bay door closing. The sum of the time taken to complete the landing gear retraction sequence stages is the retraction time $T_R$. In each scenario the time taken to complete each stage of the landing gear retraction sequence is the same. In each scenario the aircraft lifts off from the runway at the time of lift-off $T_{LOF}$ of the aircraft.

In S1, a command to retract the landing gear is received from the pilot, after lift-off, at $T_2$ such that opening of the landing gear bay door is initiated at $T_2$ and the landing gear retraction sequence is completed at time $T_2+T_R$ after the time of lift-off $T_{LOF}$ of the aircraft. In S2, opening of the landing gear bay door is automatically initiated at $T_1$ and a command to retract the landing gear is received from the pilot at $T_2$, which coincides with completion of the door opening stage. $T_1$ is sooner after the lift-off time $T_{LOF}$ than $T_2$, meaning that the landing gear retraction sequence is completed at time $T_1+T_R$ after the time of lift-off $T_{LOF}$. This is earlier than in S1 and may be associated with aircraft climb rate benefits due to the earlier reduction in drag associated with the landing gear reaching the stowed position and the landing gear bay door reaching the closed position. In S2, in the period between $T_1$ and $T_2$, the drag caused by the landing gear bay door is greater than in S1, but the performance benefit associated with retracting the landing gear earlier more than offsets this. In other scenarios, the command to retract the landing gear may be received from the pilot at a time between $T_1$ and $T_2$, but the landing gear retraction sequence would still be completed at the same time as shown in S2 because the landing gear retraction is initiated after the landing gear bay door reaches the open position.

In S3, opening of the landing gear bay door is initiated at $T_1$, as in S2, but a command to retract the landing gear is not received from the pilot until $T_3$, which is after $T_2$. Such a scenario may occur in the event that the landing gear bay door is automatically opened after lift-off, but the landing gear is not actually retracted until receipt of the command from the pilot to retract the landing gear at $T_3$. In S3, $T_3$ is later than $T_2$ by a delay time, $T_D$, meaning that the landing gear retraction sequence is completed at time $T_1+T_R+T_D$ after the time of lift-off $T_{LOF}$. Between $T_2$ and $T_3$, the landing gear bay doors are in the open position and the landing gear is not being retracted, which causes additional drag on the aircraft during the take-off procedure compared to both S1 and S2. A delay in receiving the command to retract the landing gear from the pilot may be due to the high workload on the pilot during the take-off procedure, which may be exacerbated, for example, by an OEI situation. The additional time taken to complete the landing gear retraction sequence results in additional cumulative drag on the aircraft. There is a threshold door-open time at which any benefits gained by automatically opening the landing gear bay door before the command to retract the landing gear bay door is received are negated by the additional drag caused by keeping the landing gear bay door in the open position during the delay time $T_D$.

In S4, opening of the landing gear bay door is initiated at $T_1$ but a command to retract the landing gear is not received by $T_4$, which is after $T_3$. Again, such a scenario may occur in the event that the landing gear bay door is automatically opened after lift-off, but the landing gear is not actually retracted until receipt of the command from the pilot to retract the landing gear. At $T_4$, and in accordance with the aircraft system 100 described herein, automatic closing of the landing gear bay door is initiated. The time at which automatic closing of the landing gear bay door is initiated may be selected so as to reduce or minimise the impact on aircraft performance of the landing gear bay door being in the open position for a prolonged period while the command to retract the landing gear is delayed.

Figure 3:
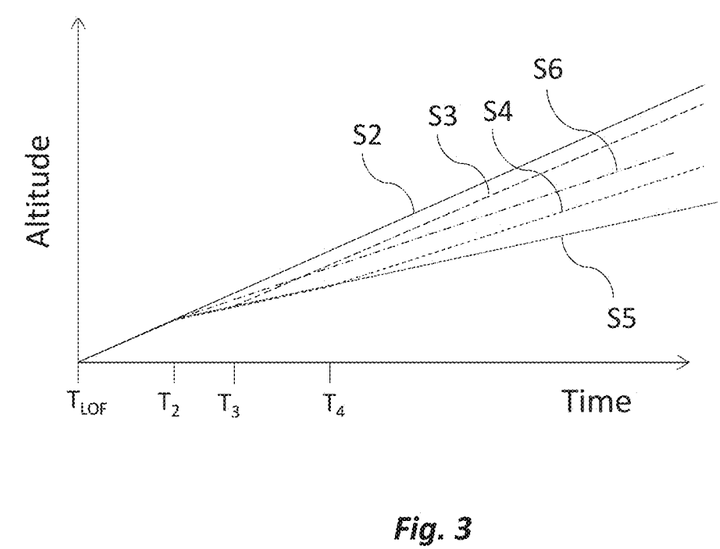
FIG. 3 shows a diagrammatic of aircraft trajectories during take-off procedures in different take-off scenarios.

FIG. 3 shows a diagrammatic representation of aircraft trajectories during take-off procedures in different take-off scenarios: S2-S6. Scenarios S2, S3 and S4 are as described above with reference to FIG. 2. Scenario S5 is similar to S4, except that the landing gear bay door remains in the open position after $T_4$ (i.e. the aircraft system 100 described herein is not present). Scenario S6 is similar to S4, except that there is no automatic opening of the landing gear bay door (and there is no command from the pilot to retract the landing gear), so the landing gear bay door remains closed and the landing gear remains extended during the period being considered here. FIG. 3 shows that the delay in the command to retract the landing gear bay door (received at $T_3$) in S3 causes a reduction in aircraft altitude compared to scenario S2. Once the landing gear is retracted and the landing gear bay door is closed, the aircraft climb rate increases to substantially the same as in S2. FIG. 3 also shows that by closing the landing gear bay door at $T_4$ in S4, the aircraft climb rate is increased compared to when the landing gear bay door is in the open position (i.e. between $T_2$ and $T_4$), but is lower than in S2 and S3 because the landing gear is still in the extended position, which causes additional drag compared to S2 and S3. In contrast, leaving the landing gear bay door open, as in S5, causes the aircraft to operate at an even lower climb rate than in S4, due to the drag caused by the landing gear remaining extended and the landing gear bay door remaining open.

In Scenario S6, since the landing gear bay door is not opened during the period being considered here, there is no associated increase in drag caused by the landing gear bay door being open, but there remains drag caused by the extended landing gear. As such, the climb rate is less than in scenarios S2 and S3. It will, however, be noted that the altitude difference between scenarios S4 and S6 is small (for example less than twenty feet or less than ten feet). Accordingly, it is evident that the degradation in altitude attainable as a result of automatically opening the landing gear bay door (as in S4 and S5) need only be small if the landing gear bay door is subsequently automatically closed (as in S4), and the climb rate in scenario S4 recovers to match that in scenario S6 once the landing gear bay door is closed. Therefore, in most cases, when the pilot promptly commands retraction of the landing gear once the landing gear bay door is at least partially open, the automatic opening of the landing gear bay door can result in the aircraft achieving a given altitude sooner than if the landing gear bay door were not to begin opening until after landing gear retraction is commanded by the pilot, as discussed above in the comparison of scenarios S1 and S2. The benefits of automatically opening the landing gear bay door can therefore be realised in most circumstances. However, in cases when the pilot is less prompt to command retraction of the landing gear once the landing gear bay door is at least partially open as a result of being caused to automatically opening, the altitude penalty resulting from automatically opening the landing gear bay door need only be small when the landing gear bay door is subsequently automatically closed (as in S4).

In this example, the controller 110 is configured to initiate the automatic closing of the landing gear bay door on the basis of a determination that the aircraft is in-flight. This may help to ensure that the automatic closing of the landing gear bay door 130 does not occur when, for example, the aircraft is undergoing maintenance. During maintenance, maintenance crew could otherwise be injured by automatic closing of the landing gear bay door 130.

In this example, the predetermined door-closing criterion comprises that the landing gear bay door 130 has been in the open position for a predetermined door-open period, as measured from a predetermined point in time. In some examples, the predetermined door-open period is determined based on the drag caused by the landing gear bay door 130 being in the open position during the take-off procedure and its effect on the climb rate of the aircraft. In some examples, the pre-determined door-open period is determined based on the time taken for the landing gear bay door 130 to move from the open position to the closed position.

In some examples, the predetermined point in time is a point in time at which, during the take-off procedure, the controller initiates automatic opening of the landing gear bay door from the closed position towards the open position. With reference to S4 in FIG. 2, this is at $T_1$. In an example, the aircraft comprises a two-stage lever to retract the landing gear 140, with a first input comprising a command to open the landing gear bay door 130, and a second input comprising a command to retract the landing gear 140 to the stowed position and to subsequently close the landing gear bay door 130. In such an example, the controller 110 is configured to initiate the automatic closing of the landing gear bay door 130 if the second input is not received within the predetermined door-open period, starting from the point in time at which the first input is received.

In other examples, the predetermined point in time is a point in time at which, during the take-off procedure, the landing gear bay door 130 reaches the open position after opening of the landing gear bay door 130 from the closed position towards the open position. In examples, the controller 110 is configured to initiate the automatic closing of the landing gear bay door 130 if the command to retract the landing gear is not received within the predetermined door-open period, starting from the point in time at which the landing gear bay door 130 reached the open position after the controller 110 has automatically opened the landing gear bay door 130. With reference to S4 in FIG. 2, this is at $T_2$. In the example of the preceding paragraph, in which the aircraft comprises a two-stage lever to retract the landing gear 140, the controller 110 is configured to initiate the automatic closing of the landing gear bay door 130 if the second input is not received within the predetermined door-open period, starting from the point in time at which the landing gear bay door 130 reached the open position in response to the controller 110 receiving the first input.

In the example of FIG. 1, the predetermined point in time is a point in time at which it is determined by the controller that lift-off of the aircraft has occurred (with reference to S4 in FIG. 2, this is at $T_{LOF}$). In other examples, the predetermined point in time is a point in time at which it is determined by the controller 110 that weight off wheels has occurred. In some examples, a determination that lift-off has occurred is based on one or more of: aircraft speed, aircraft altitude, weight on wheels, wheel speed, landing gear strut length, aircraft rotation and aircraft angle. In some examples, the controller 110 is configured to receive signals indicative of one or more of the above variables from a separate aircraft system, such as the separate aircraft system 102. In other examples, the controller 110 is configured to receive a signal indicative that lift-off has occurred.

In examples, the door-closing criterion comprises that a climb rate of the aircraft is below a climb rate threshold. In other examples, the door-closing criterion comprises that an altitude of the aircraft is below an altitude threshold at a given time after lift-off. As shown in S3 and S4 of FIG. 3, automatically closing the landing gear bay door can help to increase a climb rate of the aircraft.

In the example of FIG. 1, the controller 110 is configured to initiate the automatic closing of the landing gear bay door 130 in the event that the controller 110 determines that the predetermined door-closing criterion is met and a OEI situation has occurred. During a take-off procedure in which all engines are operative, the aircraft may have sufficient thrust to complete the take-off procedure without needing to automatically close the landing gear bay door 130. In an OEI situation, in which less thrust is available, the drag effect of the landing gear bay door being open for longer than the predetermined door-open period may reduce the aircraft climb rate by more than an acceptable amount, which may, for example, be detrimental during a take-off procedure on an obstacle-limited runway.

The one engine inoperative (OEI) condition can be detected in any suitable way that would be known to the skilled person. In examples, the controller 110 is configured to determine that an OEI situation has occurred based on one or more of: a signal indicative of engine speed; a signal indicative of engine oil temperature; a signal indicative of engine oil pressure; a signal indicative of engine vibration; a signal indicative of engine thrust; a signal indicative of exhaust gas temperature; a signal indicative of an engine pressure ratio; and a signal indicative of an aircraft acceleration rate during the take-off procedure. In other examples, the controller 110 is configured to receive a signal indicative of whether an OEI situation has occurred from a separate aircraft system, such as the separate aircraft system 102 referred to above.

In the example of FIG. 1, the controller 110 is configured to lock the landing gear bay door 130 in the closed position when the landing gear bay door 130 reaches the closed position after the automatic closing. This may help to ensure that the landing gear bay door 130 stays in the closed position until the command to retract the landing gear 140 is received. In some examples, the controller 110 is configured to de-pressurise the landing gear extension and retraction system 120 when the landing gear bay door 130 is locked in the closed position.

In the example of FIG. 1, the controller 110 is configured, during the take-off procedure, to initiate, prior to receiving the command to retract the landing gear 140 and prior to initiating the automatic closing of the landing gear bay door 130, automatic opening of the landing gear bay door 130 from the closed position towards the open position. This is, for example, as shown in S4 in FIG. 2. Automatically opening the landing gear bay door 130 may enable the aircraft climb rate to be increased earlier in the take-off procedure, or the aircraft to reach a given altitude sooner. This is because, in a comparable landing gear retraction sequence, such as S2 shown in FIG. 2, the landing gear 140 is retracted sooner after receipt of a command to retract the landing gear 140 compared to when the landing gear bay door is not automatically opened prior to receiving the command to retract the landing gear 140, such as in S1 in FIG. 2. This is achievable while maintaining that authority for retracting the landing gear can remain with the pilot or another member of the flight crew.

In the example of FIG. 1, the controller 110 is configured to initiate the automatic opening of the landing gear bay door 130 on the basis of a determination by the controller 110 that a one engine inoperative situation has occurred and that lift-off of the aircraft has occurred. This may ensure that the landing gear bay door 130 is only opened once the aircraft is in-flight. It may be beneficial to keep the landing gear bay door 130 in the closed position before lift-off to prevent, for example, debris from the runway entering, and possibly damaging, the landing gear bay.

In an example, an aircraft system comprises a controller that is configured, during a take-off procedure, to automatically cause a landing gear bay door of the aircraft to move from an open position towards a closed position, on the basis of a determination that a command to retract a landing gear has not been received within a predetermined period after lift-off of the aircraft. The controller may be configured to detect that lift-off has occurred or may be configured to receive a signal indicative of whether lift-off has occurred.

Figure 4:
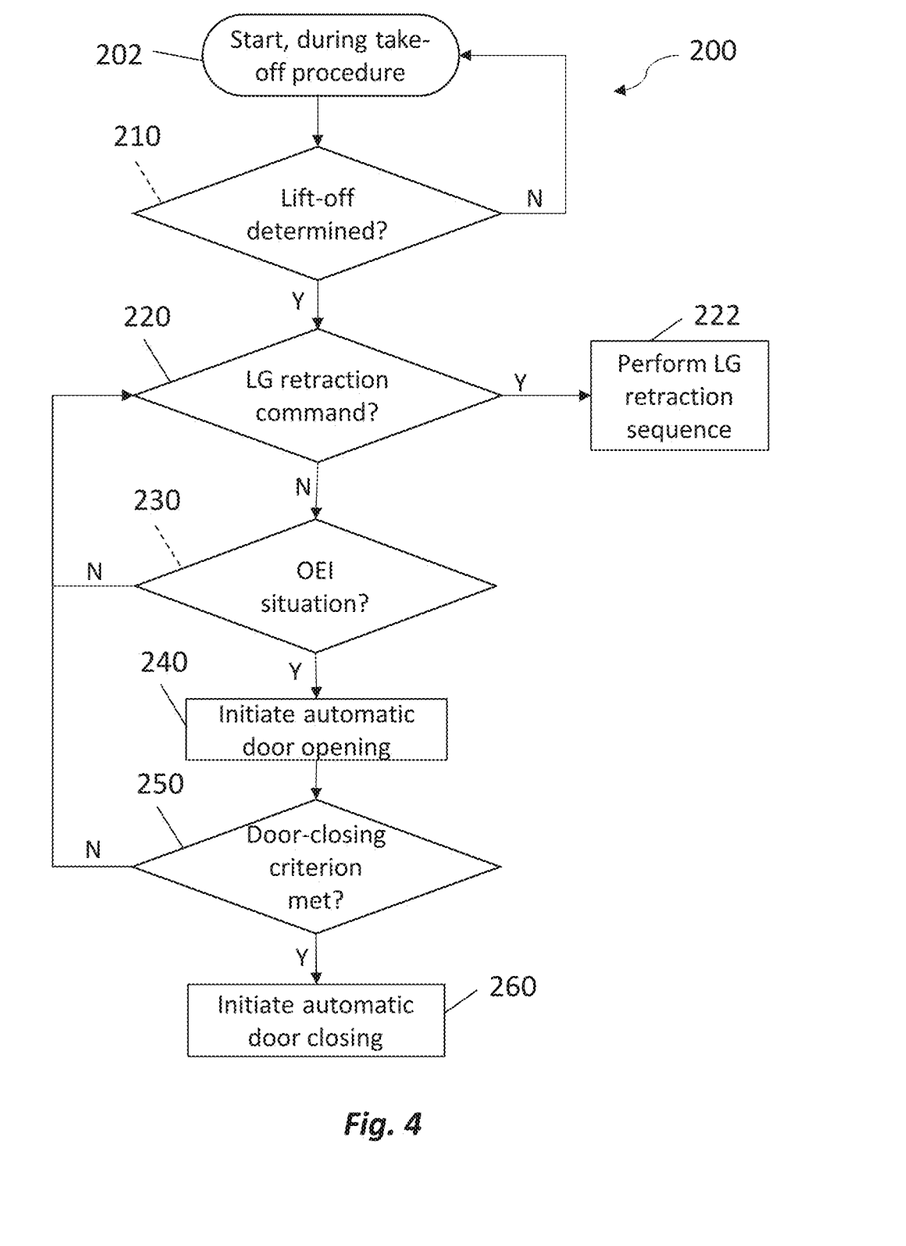
FIG. 4 shows a flow diagram showing an example of a method of operating a controller of an aircraft system of an aircraft during a take-off procedure.

There will now be described a method of operating a controller of an aircraft system of an aircraft during a take-off procedure. The aircraft system may, for example, be any aircraft system described above, such as the aircraft system 100 illustrated in FIG. 1. The controller may, for example, be the controller 110 as described in any of the examples given above. FIG. 4 shows a flow chart showing a method 200 according to an example. In other examples, one or more parts of the method 200 may be omitted.

The method 200 starts during a take-off procedure of the aircraft (as shown in start box 202), for example at the start of an acceleration down a runway. The method 200 comprises the controller determining that lift-off of the aircraft has occurred (as shown in decision box 210). In this example, when the outcome of the decision box 210 is negative, the method 200 returns to the start 202.

In this example, when the outcome of the decision box 210 is positive, a determination is made by the controller as to whether a command to retract a landing gear has been received (as shown in decision box 220). When the command to retract the landing gear has been received, the landing gear retraction sequence is performed (as shown in action box 222). The landing gear retraction sequence is as described with reference to FIG. 2 and comprises opening a landing gear bay door (if it is not already open, as discussed below), retracting the landing gear and subsequently closing the landing gear bay door.

In this example, when the outcome of the decision box 220 is negative, a determination is made by the controller as to whether a OEI situation has occurred (as shown in decision box 230). In this example, when the outcome of decision box 230 is negative, the method returns to decision box 220.

In this example, when the outcome of decision box 230 is positive, automatic opening of a landing gear bay door from a closed position to an open position is initiated by the controller (as shown in action box 240). The landing gear bay door is arranged, when at the closed position, to at least partially cover a landing gear bay into which the landing gear is retractable, as described with reference to the aircraft system 100 shown in FIG. 1.

The method 200 comprises the controller determining that a predetermined door-closing criterion has been met (as shown in decision box 250). In this example, when the outcome of decision box 250 is negative, the method 200 returns to decision box 220. When the outcome of decision box 250 is positive, automatic closing of the landing gear bay door from the open position to the closed position is initiated by the controller (as shown in action box 260). In some examples, the action box 250 is performed on the basis of a determination by the controller that the landing gear bay door has been in the open position for a predetermined door-open period as measured from a predetermined point in time. For example, the predetermined door-closing criterion is that the landing gear bay door has been in the open position for a predetermined door-open period as measured from a determination that lift-off has occurred. Other possible door-closing criteria that could be employed in variations to this example method are described elsewhere herein.

Figure 5:
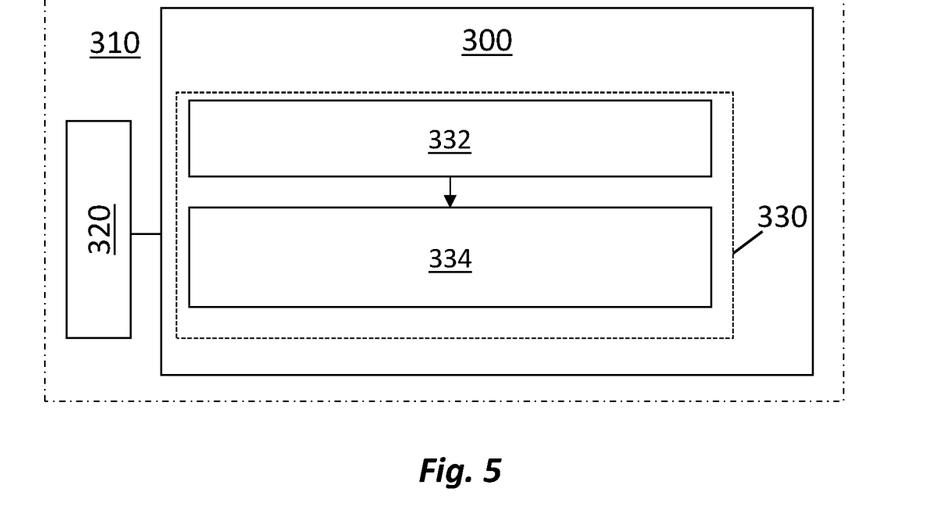
FIG. 5 shows a schematic diagram of an example of a non-transitory computer-readable storage medium.

FIG. 5 shows a schematic diagram of a non-transitory computer-readable storage medium 300 according to an example. The non-transitory computer-readable storage medium 300 stores instructions 330 that, if executed by a processor 320 of a controller 310, cause the processor 320 to perform a method according to an example. In some examples, the controller 310 is the controller 110 as described above with reference to FIG. 1 or any variation thereof discussed herein. The instructions 330 comprise: determining 332 that a predetermined door-closing criterion has been met and a command to retract a landing gear has not been received, and then initiating 334, on the basis of the determining 332, automatic closing of a landing gear bay door from an open position towards a closed position. In other examples, the instructions 330 comprise instructions to perform any other example method described herein, such as the method 200 described above with reference to FIG. 4.

Figure 6:
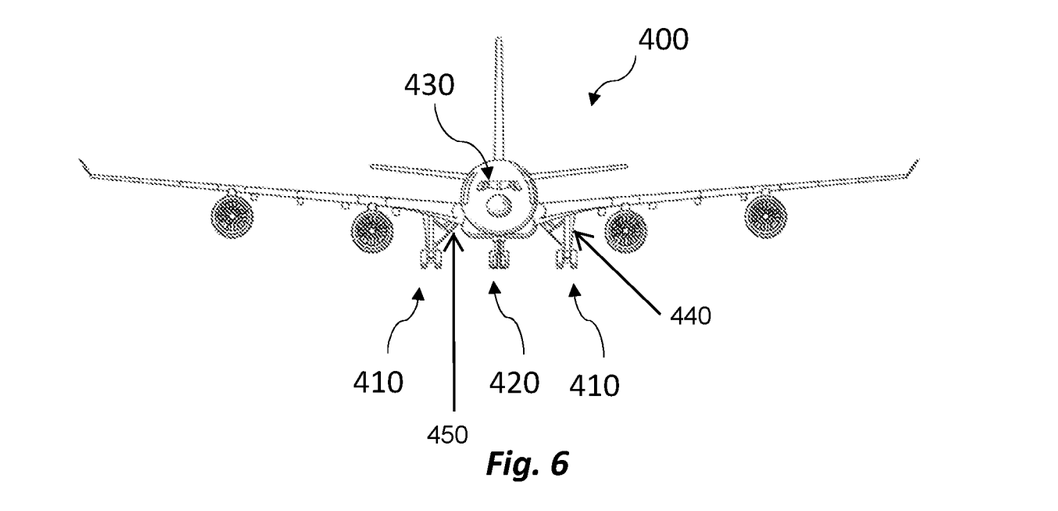
FIG. 6 shows schematic front view of an example of an aircraft.

FIG. 6 shows a schematic diagram of an aircraft 400 in accordance with an example. In this example, the aircraft 400 comprises two main landing gears 410 and a nose landing gear 420, and landing gear bay doors 440 each associated with a respective landing gear 410, 420, wherein each landing gear bay door 440 at least partially covers a respective landing gear bay 450. The aircraft 400 also comprises the non-transitory computer-readable storage medium 300 (not shown) discussed above with reference to FIG. 5. The aircraft 400 also comprises an aircraft system (not shown), such as an aircraft system 100 as described in any of the examples above with reference to FIG. 1. In this example, the aircraft system 100 comprises a plurality of landing gear extension and retraction systems 120, each associated with a respective landing gear 410, 420 of the aircraft 400. The aircraft 400 also has a cockpit 430 from where the command to retract the landing gear is received by a controller 110 of the aircraft system 100, as discussed above.

It is to be noted that the term "or" as used herein is to be interpreted to mean "and/or", unless expressly stated otherwise.

The above examples are to be understood as non-limiting illustrative examples of how the present invention, and aspects of the present invention, may be implemented. Further examples of the present invention are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the present invention, which is defined in the accompanying claims.

The invention claimed is:

1. An aircraft system for an aircraft, the aircraft system comprising a controller that is configured, during a take-off procedure, to:
   initiate automatic closing of a landing gear bay door of the aircraft from an open position towards a closed position, on the basis of a determination that a predetermined door-closing criterion has been met and a command to retract a landing gear has not been received, the landing gear being arranged to retract into a landing gear bay to be at least partially covered by the landing gear bay door when the landing gear bay door is in the closed position,
   wherein the controller is configured to initiate the automatic closing of the landing gear bay door in the event that the controller determines that the door-closing criterion is met and a one engine inoperative (OEI) situation has occurred,
   wherein a drag effect of the landing gear bay door being open for longer than the predetermined door-open period may reduce an aircraft climb rate, and
   wherein the controller is configured to maintain the landing gear in an extended position during the automatic closing of the landing gear bay door and de-pressurize a landing gear extension and retraction system when the landing gear bay door is locked in the closed position.

2. The aircraft system according to claim 1, wherein the controller is configured to cause the landing gear to remain in an extended position during the automatic closing of the landing gear bay door.

3. The aircraft system according to claim 1, wherein the controller is configured to initiate the automatic closing of the landing gear bay door on the basis of a determination that the aircraft is in-flight.

4. The aircraft system according to claim 1, wherein the predetermined door-closing criterion comprises that the landing gear bay door has been in the open position for a predetermined door-open period as measured from a predetermined point in time.

5. The aircraft system according to claim 4, wherein the predetermined point in time is a point in time at which it is determined by the controller that lift-off of the aircraft has occurred.

6. The aircraft system according to claim 4, wherein the predetermined point in time is a point in time at which it is determined by the controller that weight off wheels has occurred.

7. The aircraft system according to claim 4, wherein the predetermined point in time is a point in time at which, during the take-off procedure, the controller initiates automatic opening of the landing gear bay door from the closed position towards the open position.

8. The aircraft system according to claim 4, wherein the predetermined point in time is a point in time at which, during the take-off procedure, the landing gear bay door reaches the open position after opening of the landing gear bay door from the closed position towards the open position.

9. The aircraft system according to claim 1, wherein the predetermined door-closing criterion comprises that a climb rate of the aircraft is below a climb rate threshold.

10. The aircraft system according to claim 1, wherein the predetermined door-closing criterion comprises that an altitude of the aircraft is below an altitude threshold at a given time after lift-off.

11. The aircraft system according to claim 1, wherein the controller is configured, during the take-off procedure, to initiate, prior to receiving the command to retract the landing gear and prior to initiating the automatic closing of the landing gear bay door, automatic opening of the landing gear bay door from the closed position towards the open position.

12. The aircraft system according to claim 11, wherein the controller is configured to initiate the automatic opening of the landing gear bay door on the basis of a determination by the controller that a one engine inoperative situation has occurred and that lift-off of the aircraft has occurred.

13. An aircraft system according to claim 1, comprising:
   the landing gear;
   the landing gear bay door; and
   a landing gear extension and retraction system configured to extend and retract the landing gear and open and close the landing gear bay door.

14. The aircraft comprising the aircraft system according to claim 1.

15. An aircraft system for an aircraft, the aircraft system comprising a controller that is configured, during a take-off procedure, to automatically cause a landing gear bay door of the aircraft to move from an open position towards a closed position, on the basis of a determination that a command to retract a landing gear has not been received within a predetermined period after lift-off of the aircraft and a one engine inoperative (OEI) situation has occurred, the landing gear being arranged to retract into a landing gear bay to be at least partially covered by the landing gear bay door when the landing gear bay door is in the closed position, and wherein the controller is configured to maintain the landing gear in an extended position during the automatic closing of the landing gear bay door and de-pressurize a landing gear extension and retraction system when the landing gear bay door is locked in the closed position.

16. A method of operating a controller of an aircraft system of an aircraft during a take-off procedure, the method comprising:
   the controller determining that a predetermined door-closing criterion has been met and a command to retract a landing gear has not been received; and
   on the basis of the determination, the controller initiating automatic closing of a landing gear bay door of the aircraft from an open position towards a closed position, the landing gear bay door being arranged, when at the closed position, to at least partially cover a landing gear bay into which the landing gear is retractable,
   wherein the method comprises the controller determining if a one engine inoperative (OEI) situation has occurred, and the controller initiating the automatic closing of the landing gear bay door on the basis of a determination by the controller that one engine inoperative (OEI) situation has occurred,
   wherein a drag effect of the landing gear bay door being open for longer than the predetermined door-open period may reduce an aircraft climb rate, and
   wherein the controller is configured to maintain the landing gear in an extended position during the automatic closing of the landing gear bay door and de-pressurize a landing gear extension and retraction system when the landing gear bay door is locked in the closed position.

17. The method according to claim 16, wherein the initiating is on the basis of a determination that the landing gear bay door has been in the open position for a predetermined door-open period as measured from a predetermined point in time.

18. The method according to claim 16, comprising:
the controller determining if lift-off of the aircraft has occurred; and
on the basis of determining that the one engine inoperative situation and lift-off of the aircraft have occurred:
the controller initiating, prior to receiving the command to retract the landing gear and prior to initiating the automatic closing of the landing gear bay door, automatic opening of the landing gear bay door from the closed position towards the open position.

19. A non-transitory computer-readable storage medium storing instructions that, if executed by a controller of an aircraft system of an aircraft, cause the controller to carry out the method according to claim 16.

\* \* \* \* \*